(12) United States Patent  (10) Patent No.: US 9,174,551 B2
Nagamori  (45) Date of Patent: Nov. 3, 2015

(54) DRIVE DEVICE FOR ELECTRIC VEHICLE (71) Applicant: MITSUBISHI JIDOSHA KOGYO KABUSHIKI KAISHA, Tokyo (JP)

(72) Inventor: Takeo Nagamori, Toyota (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/581,795

(22) Filed: Dec. 23, 2014

(65) Prior Publication Data

US 2015/0175032 A1  Jun. 25, 2015

(30) Foreign Application Priority Data

Dec. 25, 2013 (JP) ................... 2013-268024

(51) Int. Cl.
*B60L 9/00* (2006.01)
*B60L 15/20* (2006.01)
*B60L 3/00* (2006.01)

(52) U.S. Cl.
CPC ........... *B60L 15/2072* (2013.01); *B60L 3/0023* (2013.01); *B60L 15/20* (2013.01); *B60L 15/2081* (2013.01)

(58) Field of Classification Search
None
See application file for complete search history.

(56) References Cited

U.S. PATENT DOCUMENTS

| 5,967,940 | A | * | 10/1999 | Yamaguchi | 477/107 |
| 2009/0187298 | A1 | * | 7/2009 | Cuppetilli et al. | 701/22 |
| 2010/0286883 | A1 | * | 11/2010 | Kato et al. | 701/70 |
| 2012/0041661 | A1 | * | 2/2012 | Kaneko | 701/70 |

FOREIGN PATENT DOCUMENTS

JP  4297135 B2  7/2009

* cited by examiner

*Primary Examiner* — Adam Alharbi
(74) *Attorney, Agent, or Firm* — Birch, Stewart, Kolasch & Birch, LLP (57) ABSTRACT

A drive device for an electric vehicle includes: a parking lock mechanism that mechanically locks a rotation of a rotating shaft of drive wheels; a parking lock operating unit; an electric motor; a balancing torque estimating unit for applying rotational torque to the electric motor in the opposite direction of the direction of torsional torque applied to the rotating shaft, while locking via the parking lock mechanism is done, and for balancing torque in advance that balances out the torsional torque, based on a state of the rotational phase of the electric motor; and a torque applying unit for applying torque to the electric motor before the locking is released, the torque calculated based on the estimated balancing torque.

20 Claims, 5 Drawing Sheets

DRIVE DEVICE FOR ELECTRIC VEHICLE

BACKGROUND

The present invention relates to a drive device for an electric vehicle with an electric motor.

Examples of an electric vehicle include a hybrid electric vehicle in which a battery is charged by an engine, and which travels using a drive force of an electric motor driven by electrical power from the battery; a hybrid electric vehicle in which a battery is charged by an engine, and which travels using a drive force of an electric motor and (or) the engine; and an electric vehicle that travels using a drive force of an electric motor.

An electric vehicle is equipped with a parking lock mechanism that locks the gear of the electric vehicle in park by mechanically locking the rotation of a drive shaft connected to an electric motor. For example, the parking lock mechanism mechanically restricts the rotation of the drive shaft by moving a claw member via the operation of an electric switch, and making the claw member engage with a gear portion of the drive shaft or the like.

In the electric vehicle with the parking lock mechanism, when the electric vehicle is stopped on a hill, and the parking lock mechanism is brought into operation, the drive wheels (drive shaft) are mechanically locked, and thereby torsional torque occurs in the drive shaft due to a rotating force of the drive wheels. For example, when the electric vehicle is stopped on a hill facing downward, a forward rotating force occurs in the drive shaft, and torsional torque occurs and is accumulated.

There is a problem in that the release of the parking lock mechanism for driving away the electric vehicle causes the rapid release of the torsional torque, and then the occurrence of a shock. In order to solve this problem, in the related art, there is proposed a technology by which drive means is driven to apply torque in the opposite direction of the direction of the torsional torque when the parking lock mechanism is released (for example, refer to Patent Document 1). The use of the technology disclosed in Patent Document 1 prevents a shock from occurring when the torsional torque is released.

However, according to the technology disclosed in Patent Document 1, the magnitude of torque applied in the opposite direction of the direction of torsional torque accumulated in the drive shaft is estimated from mechanical characteristics of the drive shaft or the like when a drive force is transmitted thereto. For this reason, there is a problem in that depending on the hill, or a state at the time of torque estimation, a large difference may occur between the magnitude of the estimated torque and the magnitude of the opposite directional torque that is actually required. Accordingly, in reality, it may not be possible to accurately and satisfactorily prevent the occurrence of a shock when the parking lock mechanism is released.

[Patent Document 1] Japanese Patent No. 4297135

SUMMARY

The present invention is made in light of the above problems, and an object of the present invention is to provide a drive device for an electric vehicle which can accurately prevent the occurrence of a shock from originating during the release of torsional torque when the parking lock mechanism is released.

According to one advantageous aspect of the present invention, there is provided a drive device for an electric vehicle comprising:

a parking lock mechanism that mechanically locks a rotation of a rotating shaft of drive wheels of a vehicle;

a parking lock operating unit for instructing an operation of the parking lock mechanism;

an electric motor that is connected to the rotating shaft of the drive wheels so that a drive power of the electric motor is transmitted to the rotating shaft;

a balancing torque estimating unit for applying rotational torque to the electric motor in the opposite direction of the direction of torsional torque applied to the rotating shaft, while locking via the parking lock mechanism is done, and for balancing torque in advance that balances out the torsional torque, based on a state of a rotational phase of the electric motor; and a torque applying unit for applying torque to the electric motor before the locking via the parking lock mechanism is released, the torque being calculated based on the balancing torque estimated by the balancing torque estimating unit.

The drive device for an electric vehicle may be configured such that: the balancing torque estimating unit estimates torque, when the rotational phase of the electric motor starts to change in a state where the opposite directional rotational torque is applied to the electric motor, as the balancing torque.

The drive device for an electric vehicle may be configured such that: the balancing torque estimating unit estimates the balancing torque by applying the opposite directional rotational torque to the electric motor when receiving a signal indicative of the turning-on of an ignition switch.

The drive device for an electric vehicle may further comprise a balancing torque storing unit for storing the estimated balancing torque. The drive device for an electric vehicle may be configure such that: the balancing torque estimating unit estimates the balancing torque by applying the opposite directional rotational torque to the electric motor, and then the balancing torque estimating unit releases an application of the rotational torque, and after the locking is released by the parking lock operating unit, the torque applying unit applies the balancing torque, stored in the balancing torque storing unit, to the electric motor.

The drive device for an electric vehicle may be configured such that: the balancing torque estimating unit estimates the balancing torque by applying the opposite directional rotational torque to the electric motor until the locking via the parking lock mechanism is released after the locking is released by the parking lock operating unit.

The drive device for an electric vehicle may further comprise a incline detecting unit for detecting a state of an inclinations of the vehicle. The drive device for an electric vehicle may be configured such that: the balancing torque estimating unit determines a direction of the torque being applied to the electric motor based on a direction of the inclinations detected by the incline detecting unit.

DETAILED DESCRIPTION OF EXEMPLIFIED EMBODIMENTS

An electric vehicle of an embodiment is a hybrid vehicle in which a high-voltage battery is charged by driving a generator using an engine, and which travels using a drive force of an electric motor and the engine.

The embodiment of the present invention will be described with reference to FIGS. 1 to 4.

Figure 1:
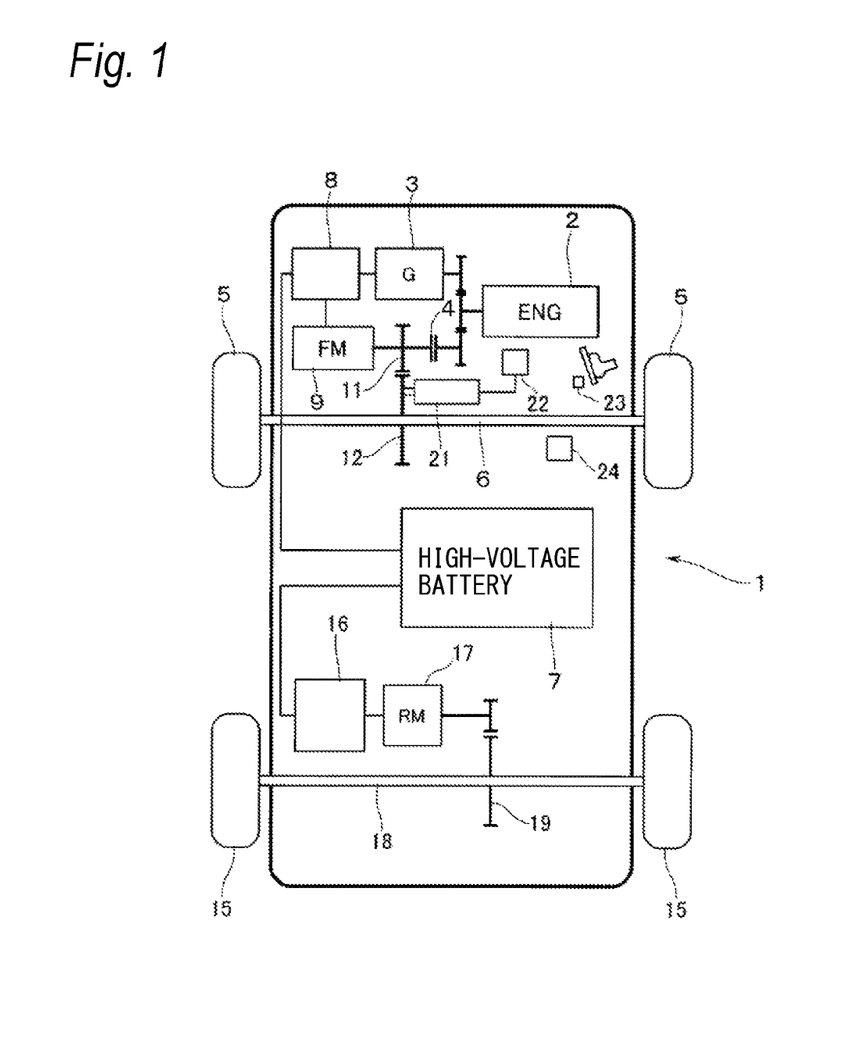
FIG. 1 is a schematic diagram of a drive device for an electric vehicle according to an embodiment of the present invention.
Figure 2:
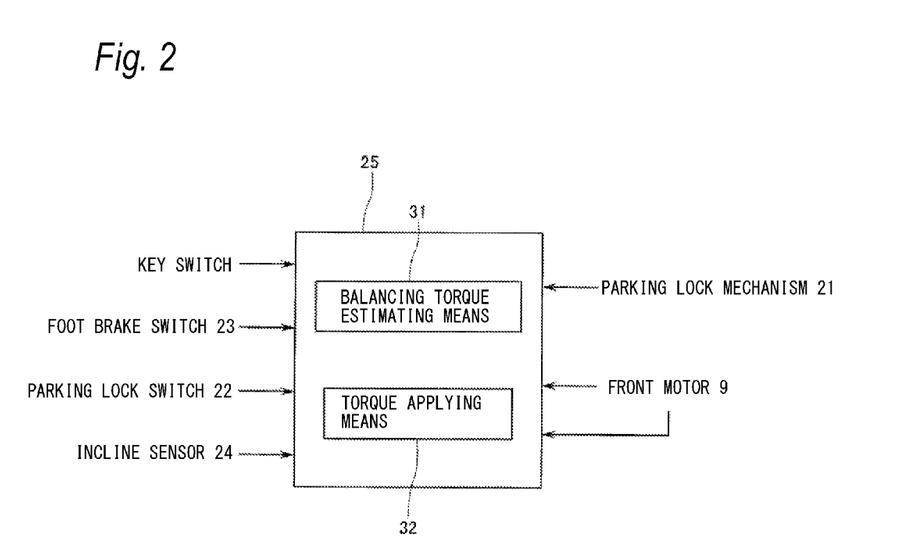
FIG. 2 is a control block diagram.
Figure 3:
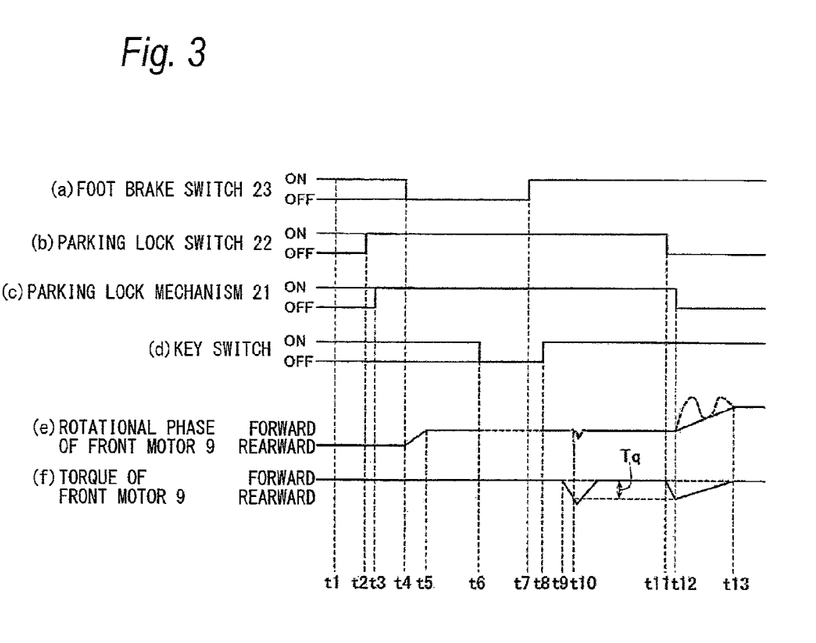
FIG. 3 is a timing chart.
Figure 4:
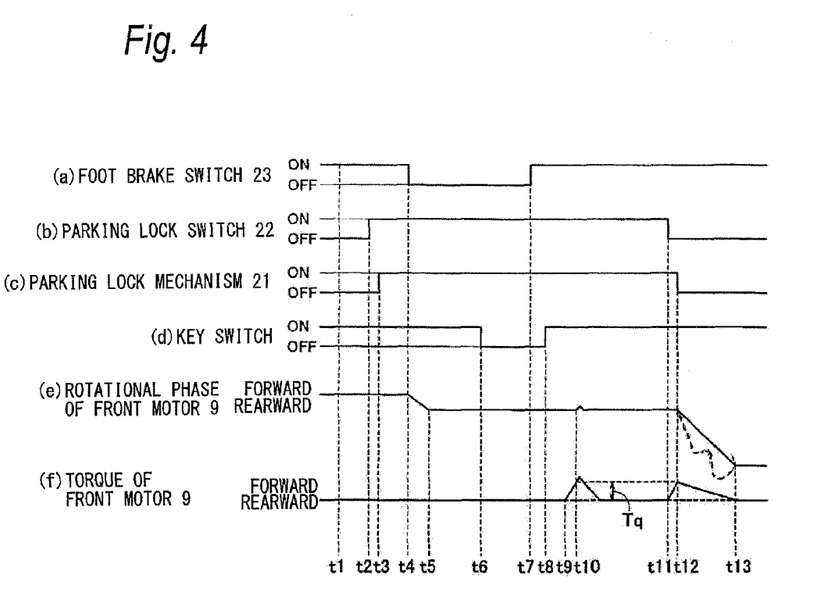
FIG. 4 is a timing chart when a slope is inclined in an opposite direction.

FIG. 1 is a schematic diagram illustrating the entire configuration of the electric vehicle (hybrid vehicle) with the drive device according to the embodiment of the present invention. FIG. 2 is a block diagram illustrating a control state of the drive device according to the embodiment of the present invention. FIG. 3 is a timing chart illustrating a time-dependent change in the control of the drive device according to the embodiment of the present invention. FIG. 4 is a timing chart when a slope is inclined in an opposite direction.

The outline of the electric vehicle according to the embodiment of the present invention will be described with reference to FIG. 1.

As illustrated in FIG. 1, a vehicle 1 includes an engine 2, and a generator 3 driven by the engine 2. An output system of the engine 2 is connected to an axle 6 of front wheels 5 via a clutch 4. A front motor 9 (electric motor) is connected to the generator 3 via an inverter 8, and the front motor 9 is connected to the axle 6 of the front wheels 5. The inverter 8 is connected to a high-voltage battery 7, and electrical power stored in the high-voltage battery 7 is supplied to the front motor 9 via the inverter 8.

That is, an output system 11 of the front motor 9 is connected to the axle 6 via a speed reduction mechanism 12, and the output system of the engine 2 is connected to the output system 11 of the front motor 9 via the clutch 4. Accordingly, the generator 3 is driven by the engine 2, and thereby the high-voltage battery 7 is charged. When the clutch 4 is engaged, the vehicle 1 travels using the drive force of the engine 2, and when the clutch 4 is disengaged, the vehicle 1 travels using the drive force of the front motor 9.

A rear motor 17 is connected to the high-voltage battery 7 via an inverter 16 of rear wheels 15, and an output system of the rear motor 17 is connected to a speed reduction mechanism 19 of an axle 18. Electrical power stored in the high-voltage battery 7 is supplied to the rear motor 17 via the inverter 16, and as necessary, the axle 18 (the rear wheels 15) is driven via the speed reduction mechanism 19 by the driving of the rear motor 17.

In contrast, the vehicle 1 is equipped with a parking lock mechanism 21 that mechanically locks the rotation of the axle 6 of the front wheels 5. For example, a lock pin protrudes and engages with a predetermined portion of a gear member rotating with the axle 6, thereby restricting the rotation of the gear member (rotation of the axle 6). The locking of the rotation of the gear member (rotation of the axle 6) is released by the release of the lock pin.

When a gear shift lever is operated so as to be in a parking position (P position), a parking lock switch 22 is electrically operated, and the parking lock mechanism 21 operates and mechanically locks the rotation of the axle 6. Accordingly, even when the vehicle 1 is stopped on an inclined road such as a hill, and a foot brake pedal (service brake pedal) is released, the vehicle 1 does not move due to the weight thereof.

The vehicle 1 includes a foot brake pedal switch 23 for detecting the operation of the foot brake pedal, and an incline sensor 24 as incline detecting means for detecting an inclined state of the vehicle 1. The following information is input into control means 25 illustrated in FIG. 2: information of a key switch (ignition switch), the foot brake pedal switch 23, the incline sensor 24, and the parking lock switch 22.

In the vehicle 1 with the parking lock mechanism 21, when the vehicle 1 is stopped on a hill, and the parking lock mechanism 21 is brought into operation, the front wheels 5 (the axle 6) are mechanically locked, and thereby torsional torque occurs in the drive shaft (rotating shaft) due to a rotating force of the front wheels 5. For example, when the vehicle 1 is stopped on a hill facing downward, a forward rotating force occurs in the drive shaft, and torsional torque occurs; however, since a lock pin mechanically protrudes and engages with the gear member, the torsional torque is accumulated.

For this reason, even when the parking lock mechanism 21 is released, for example, when the protrusion of the lock pin is released, and the lock pin is detached from the gear member, the parking lock mechanism 21 is designed in such a manner that the torsional torque is not rapidly released, and a shock does not occur. That is, the front motor 9 is driven so as to apply torque in the opposite direction of the direction of the torsional torque accumulated in the drive shaft, and thereby the occurrence of a shock is prevented when the torsional torque is released.

Specifically, while the parking lock mechanism 21 is in operation, when rotational torque is applied to the front motor 9 in the opposite direction of the direction of the torsional torque applied to the drive shaft, balancing torque is estimated to be torque when the rotational phase of the front motor 9 starts to change. Before the operation of the parking lock mechanism 21 is released, toque (opposite directional rotational torque) equivalent to the balancing torque is applied to the front motor 9, thereby accurately preventing the occurrence of a shock from originating during the release of the parking lock mechanism 21.

Specifically, the control means 25 will be described with reference to FIG. 2.

As illustrated in FIG. 2, the control means 25 includes balancing torque estimating means 31, balancing torque storing means, and torque applying means 32.

The following information is input into the control means 25: detection information of the key switch, the foot brake pedal switch 23, the incline sensor 24, and the parking lock switch 22, and information of the operation of the parking lock mechanism 21. A signal indicative of torque being applied is sent to the front motor 9 from the control means 25 so as to obtain the balancing torque, and a state of the rotational phase of the front motor 9 at that time is sent to the control means 25.

The balancing torque estimating means 31 applies rotational torque to the front motor 9 in the opposite direction of the direction of the torsional torque applied to the drive shaft. For example, when the parking lock mechanism 21 is brought into operation while the vehicle 1 is stopped on a hill facing downward, a torsional force for rotating the front wheels 5 in the forward direction occurs in the drive shaft, and for this reason, torque is applied to the front motor 9 in the rearward rotation direction of the front wheels 5.

The balancing torque is estimated to be torque when the rotational phase of the front motor 9 starts to change, that is, when the rear wheels 15 start to rotate in the rearward direction. The balancing torque storing means stores the balancing torque estimated by the balancing torque estimating means 31.

When the parking lock mechanism 21 is released, the torque applying means 32 applies the balancing torque, stored in the balancing torque storing means, to the front motor 9. For example, since a torsional force for rotating the front wheels 5 in the forward direction is accumulated in the drive shaft, when the parking lock mechanism 21 is released while the vehicle 1 is stopped on a hill facing downward, an accumulated torsional force is released, and a force for rotating the front wheels 5 in the forward direction is exerted, thereby causing the occurrence of a shock.

Since the balancing torque is applied to the front motor 9, during the release of the parking lock mechanism 21, a force for rotating the front wheels 5 in the rearward direction is exerted due to the application of the balancing torque to the front motor 9, and thereby the force balances out the rotating force that causes the occurrence of a shock, and the occurrence of a shock is prevented even though the accumulated torsional force is released.

For this reason, it is possible to estimate the balancing torque based on the actual state of the rotational phase of the front motor 9, that is, based on the actual state of the balancing of torque when the vehicle 1 is stopped. Accordingly, it is possible to accurately prevent the occurrence of a shock from originating during the release of the parking lock mechanism 21.

The torque applied by the torque applying means 32 is not limited to the balancing torque estimated by the balancing torque estimating means 31, and it is possible to prevent the occurrence of a shock to some extent even when torque (for example, 70% of the balancing torque) calculated based on the balancing torque is applied to the front motor 9.

Specifically, a state in which the occurrence of a shock from originating during the release of the parking lock mechanism 21 is prevented will be described with reference to FIG. 3.

FIG. 3 illustrates a state in which the incline sensor 24 determines that the vehicle 1 is stopped on a hill facing downward. Since an incline direction is determined by the incline sensor 24, it is possible to immediately determine the rotation direction of the front motor 9, which is required in order to estimate the balancing torque.

Since the drive shaft is locked by the parking lock mechanism 21, it is not possible to generate torque in this direction, that is, it is not possible to rotate the front motor 9 in this direction. For this reason, when the balancing torque is estimated in a state where the incline sensor 24 is not provided, it is possible to confirm a state of the rotation of the front motor 9, and to apply torque only in a rotatable direction.

As illustrated in (a) of FIG. 3, when the foot brake pedal is continuously depressed so as to stop the vehicle 1, the foot brake pedal switch 23 is turned on, and the vehicle 1 is stopped at a time t1.

As illustrated in (b) of FIG. 3, for example, at a time t2, when the gear shift lever is operated so as to be in a parking position (P position), the parking lock switch 22 is electrically operated (turned on). As illustrated in (c) of FIG. 3, after the parking lock switch 22 is electrically turned on, at a time t3, the parking lock mechanism 21 is operated and mechanically locks the rotation of the axle 6.

As illustrated in (a) of FIG. 3, at a time t4, the depression of the foot brake pedal is released, and the foot brake pedal switch 23 is turned off. At the same time, a torsional force for rotating the front wheels 5 in the forward direction occurs in the drive shaft, as illustrated in (e) of FIG. 3, the drive shaft rotates by the amount of mechanical play in the parking lock mechanism 21 during a time period from a time t4 to a time t5, and the rotational phase of the front motor 9 changes in the forward direction.

As illustrated in (d) of FIG. 3, at a time t6, the key switch is turned off, and the vehicle 1 is brought into a parking state.

In order to drive the vehicle 1 away, a driver gets on the vehicle 1, and depresses the foot brake pedal, then as illustrated in (a) of FIG. 3, the foot brake pedal switch 23 is turned on at a time t7, and as illustrated in (d) of FIG. 3, the key switch is turned on at a time t8.

The balancing torque estimating means 31 starts an operation of estimating the balancing torque during a time period from when a signal indicative of the turning-on of the key switch is received at a time t8 to when the parking lock switch 22 is turned off at a time t11. For this reason, it is possible to reliably estimate the balancing torque.

As illustrated in (f) of FIG. 3, at a time t9, rotational torque is gradually applied to the front motor 9 in the opposite direction (rearward direction) with respect to a phase change (e) of the front motor 9 in the forward direction. As illustrated in (e) of FIG. 3, at a time t10, the phase of the front motor 9 starts to change.

As illustrated in (f) of FIG. 3, the balancing torque storing means stores torque Tq at a time t10 as the balancing torque. That is, the balancing torque Tq is equivalent to opposite directional rotational torque that is substantially the same as the accumulated torsional rotational torque. As illustrated in (f) of FIG. 3, the application of the torque to the front motor 9 is released in order to estimate the balancing torque.

As illustrated in (b) of FIG. 3, for example, at a time t11, the gear shift lever is changed from the P position to a drive position (D position), and the parking lock switch 22 is electrically turned off. At the same time, as illustrated in (f) of FIG. 3, the balancing torque Tq is applied to the front motor 9.

As illustrated in (c) of FIG. 3, at a time t12, the parking lock mechanism 21 is brought into a non-operation state, and the mechanical locking of the axle 6 is released. As illustrated in (f) of FIG. 3, the balancing torque Tq is applied to the front motor 9 during a time period (from a time t11 to a time t12) from when the parking lock mechanism 21 is brought into a non-operation state to when the mechanical locking of the axle 6 is released.

As illustrated in (e) of FIG. 3, the front motor 9 rotates in the direction in which the vehicle 1 moves forward during a time period from a time t12 to a time t13, and as illustrated in (f) of FIG. 3, the balancing torque Tq being applied decreases gradually during a time period from a time t12 to a time t13.

When the parking lock mechanism 21 is brought into a non-operation state, and the mechanical locking of the axle 6 is released, the torsional force accumulated in the drive shaft is released. At this time, in a case where the balancing torque Tq is not applied to the front motor 9, a rotating force for rotating the front wheels 5 in the forward direction is exerted on the axle 6, and during a time period from a time t12 to a time t13 as illustrated by the dotted line in (e) of FIG. 3, the rotational phase of the front motor 9 rapidly changes in the forward and rearward direction, and a shock occurs.

In the embodiment, since the balancing torque Tq is applied to the front motor 9 during a time period from when the parking lock mechanism 21 is brought into a non-operation state to when the mechanical locking of the axle 6 is released (from a time t11 to a time t12), a shock does not occur during a time period from a time t12 to a time t13 as illustrated by the dotted line in (e) of FIG. 3.

In the embodiment, since the balancing torque Tq is estimated to be the torque when the rotational phase of the front motor 9 changes, it is possible to apply the balancing torque Tq (the torque being substantially the same as the torque at the release of the accumulated torsional rotation) to the front motor 9 in the opposite direction. For this reason, the value of the torque Tq can be estimated to be the value of the appropriate torque depending on the situation.

For this reason, while taking into consideration the actual state of the balancing of torque when the vehicle 1 is stopped, it is possible to estimate the balancing torque, and it is possible to accurately prevent the occurrence of a shock from originating during the release of the parking lock mechanism 21.

After the balancing torque Tq is estimated by applying torque to the front motor 9, and then the application of the torque for estimating the balancing torque Tq is released, the balancing torque Tq is applied to the front motor 9 so as to prevent the occurrence of a shock. For this reason, it is possible to supply electrical power to the front motor 9 only as necessary, and to prevent the wasting of electrical power.

In addition, it is possible to continuously apply torque for estimating the balancing torque Tq until torque for preventing the occurrence of a shock is applied.

Since the balancing torque Tq is estimated during a time period from when the ignition switch is turned on to when the parking lock switch 22 is electrically turned off, it is possible to estimate the balancing torque Tq before the parking lock mechanism 21 is brought into a non-operation state.

Since the balancing torque Tq is applied to the front motor 9 during a time period from when the parking lock switch 22 is electrically turned off to when an operation of releasing the parking lock mechanism 21 occurs, it is possible to apply the balancing torque Tq to the front motor 9 at an appropriate time, and to reliably prevent the occurrence of a shock.

Accordingly, it is possible to accurately prevent the occurrence of a shock from originating during the release of the torsional torque when the parking lock mechanism 21 is released.

An operation when a slope is inclined in the opposite direction (when a road is a hill facing upward) will be described with reference to FIG. 4. The same reference signs will be assigned to the same states as those illustrated in FIG. 3.

When the vehicle 1 is parked on a hill facing upward, as illustrated in (e) of FIG. 4, the drive shaft rotates by the amount of mechanical play in the parking lock mechanism 21 during a time period from a time t4 to a time t5, and the rotational phase of the front motor 9 changes in the rearward direction.

As illustrated in (f) of FIG. 4, at a time t9, rotational torque is gradually applied to the front motor 9 in the opposite direction (forward direction) with respect to a phase change (e) of the front motor 9 in the rearward direction. As illustrated in (e) of FIG. 4, at a time t10, the phase of the front motor 9 starts to change, and as illustrated in (f) of FIG. 4, the torque Tq at a time t10 is stored as the balancing torque. At a time t11, the balancing torque Tq is applied to the front motor 9.

As illustrated in (f) of FIG. 4, the balancing torque Tq is applied to the front motor 9 during a time period from a time t11 to a time t12. As illustrated in (e) of FIG. 4, the front motor 9 rotates in the direction in which the vehicle 1 moves rearward during a time period from a time t12 to a time t13, and as illustrated in (f) of FIG. 4, the balancing torque Tq being applied decreases gradually during a time period from a time t12 to a time t13.

In a case where the balancing torque Tq is not applied to the front motor 9, when the parking lock mechanism 21 is brought into a non-operation state, and the mechanical locking of the axle 6 is released, a rotating force for rotating the front wheels 5 in the rearward direction is exerted on the axle 6, and during a time period from a time t12 to a time t13 as illustrated by the dotted line in (e) of FIG. 4, the rotational phase of the front motor 9 rapidly changes in the forward and rearward direction, and a shock occurs.

Since the balancing torque Tq is applied (in the forward direction) to the front motor 9 during a time period from a time t11 to a time t12, similar to the case in which the vehicle is stopped on a hill facing downward, a shock does not occur during a time period from a time t12 to a time t13 as illustrated by the dotted line in (e) of FIG. 4.

Even when the vehicle 1 being parked on a hill facing upward travels in the forward direction, the torsional rotating force accumulated in the drive shaft does not cause the rotational phase of the front motor 9 to rapidly change in the forward and rearward direction, and the occurrence of a shock is prevented.

Another embodiment of the present invention will be described with reference to FIG. 5.

Figure 5:
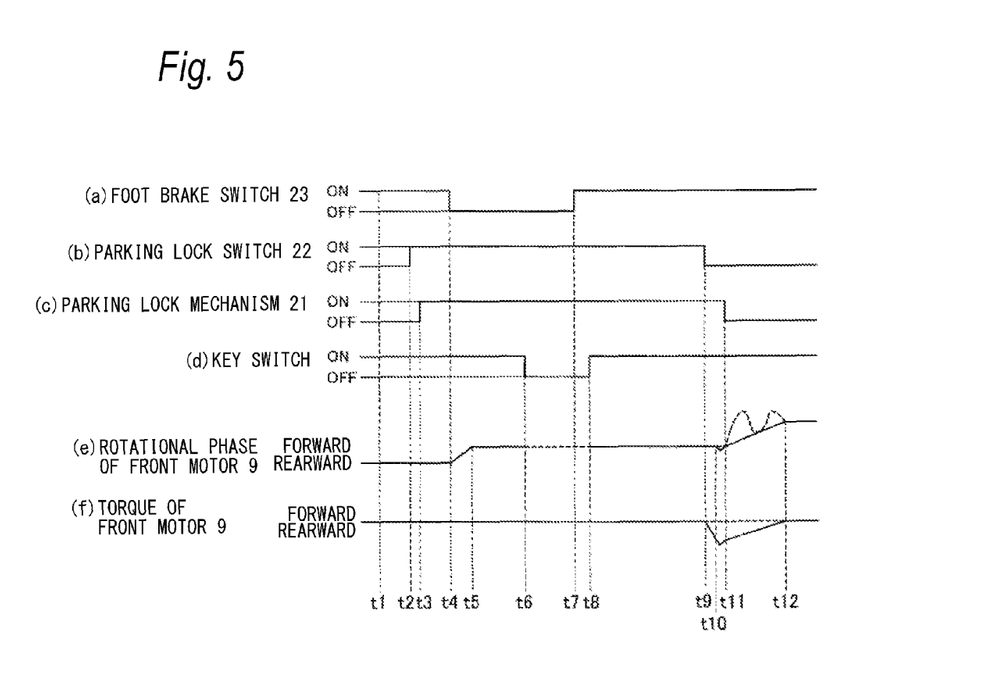
FIG. 5 is a timing chart of another embodiment.

In the embodiment illustrated in FIG. 5, after the parking lock switch 22 is turned off, the balancing torque is estimated, and the parking lock mechanism 21 is brought into a non-operation state. For this reason, the states up to a time t8 are the same as those in the embodiment illustrated in FIG. 3, and the same reference signs will be assigned to the same states as those illustrated in FIG. 3.

As illustrated in (b) of FIG. 5, for example, at a time t9, the gear shift lever is changed from the P position to the drive position (D position), and the parking lock switch 22 is electrically turned off.

As illustrated in (f) of FIG. 5, at time t9, rotational torque is gradually applied to the front motor 9 in the opposite direction (rearward direction) with respect to a phase change (e) of the front motor 9 in the forward direction. As illustrated in (e) of FIG. 5, at a time t10, the phase of the front motor 9 starts to change.

The torque Tq at a time t10 is estimated as the balancing torque Tq, and in a state where the balancing torque Tq is maintained, as illustrated in (c) of FIG. 5, at a time t11, the parking lock mechanism 21 is brought into a non-operation state, and the mechanical locking of the axle 6 is released.

As illustrated in (e) of FIG. 5, the front motor 9 rotates in the direction in which the vehicle 1 moves forward during a time period from a time t11 to a time t12, and as illustrated in (f) of FIG. 5, the balancing torque Tq being applied decreases gradually during a time period from a time t11 to a time t12.

When the parking lock mechanism 21 is brought into a non-operation state, and the mechanical locking of the axle 6 is released, the torsional force accumulated in the drive shaft is released. In the embodiment, when the parking lock mechanism 21 is brought into a non-operation state, and the mechanical locking of the axle 6 is released (at a time t11), the balancing torque Tq is applied to the front motor 9, and thereby a shock does not occur during a time period from a time t11 to a time t12 as illustrated by the dotted line in (e) of FIG. 5.

For this reason, during a time period from when the parking lock switch 22 is electrically turned off to when the operation of the parking lock mechanism is released, the balancing torque Tq is estimated by applying torque to the front motor 9 in the opposite direction, and the application of the balancing torque Tq is maintained.

For this reason, when the parking lock mechanism 21 is brought into a non-operation state, and the mechanical locking of the axle 6 is released (at a time t11), the balancing torque Tq is applied to the front motor 9, and thereby a shock does not occur during a time period from a time t11 to a time t12 as illustrated by the dotted line in (e) of FIG. 5.

Also in the embodiment, while taking into consideration the actual state of the balancing of torque when the vehicle 1 is stopped, it is possible to estimate the balancing torque, and it is possible to accurately prevent the occurrence of a shock from originating during the release of the parking lock mechanism 21.

In addition, since it is possible to estimate the balancing torque right before the parking lock mechanism 21 is released, even when the balancing torque is changed due to a decrease in weight due to, for example, the unloading of luggage from the cabin after ignition is turned on, it is possible to accurately prevent the occurrence of a shock.

As described above, in the present invention, while the parking lock mechanism is in operation, when rotational torque is applied to the electric motor in the opposite direction of the rotation direction of torsional torque applied to the rotating shaft from the drive wheels to the electric motor, and the balancing torque is estimated based on a state of the rotational phase of the electric motor at that time, and torque equivalent to the estimated balancing torque is applied to the electric motor, thereby preventing the occurrence of a shock from originating during the release of the torsional torque accumulated in the rotating shaft.

As a result, based on the actual state of the rotational phase of the electric motor, that is, based on the actual state of the balancing of torque, it is possible to prevent the occurrence of a shock from originating during the release of the torsional torque accumulated in the rotating shaft, and to accurately prevent the occurrence of a shock from originating in the parking lock mechanism.

Further, in the present invention, since the balancing torque is estimated to be the torque when the rotational phase of the electric motor changes, it is possible to apply the torque (the torque being substantially the same as the torque at the release of the parking lock) to electric motor in the opposite direction.

Further, in the present invention, when the signal indicative of the turning-on of the ignition switch is received, the balancing torque is estimated.

Further, in the present invention, after the balancing torque is estimated by applying torque to the electric motor, and then the application of the torque for estimating the balancing torque is released, the balancing torque is applied to the electric motor so as to prevent the occurrence of a shock.

Further, in the present invention, the balancing torque is estimated by applying torque to the electric motor in the opposite direction during a time period from when the parking lock operating means is released to when the operation of the parking lock mechanism is released.

Further, in the present invention, for example, the incline detecting means detects and recognizes the torsional rotation direction of a rotating system of the vehicle which is stopped on a hill facing downward or a hill facing upward, and the rotation direction for estimating the balancing torque is determined based on the recognized rotation direction.

Since the torsional rotation direction of the rotating shaft is locked by the parking lock mechanism, it is not possible to generate torque in this direction, that is, it is not possible to rotate the electric motor in this direction. For this reason, when the balancing torque is estimated in a state where the incline detecting means is not provided, it is possible to confirm a state of the rotation of the electric motor, and to apply torque only in a rotatable direction.

The drive device for an electric vehicle of the present invention can accurately prevent the occurrence of a shock from originating during the release of torsional torque when a parking lock mechanism is released.

A drive device for an electric vehicle with an electric motor according to the present invention can be applied to various industrial fields.

What is claimed is:

1. A drive device for an electric vehicle comprising:
    a parking lock mechanism that mechanically locks a rotation of a rotating shaft of drive wheels of a vehicle;
    a parking lock operating unit for instructing an operation of the parking lock mechanism;
    an electric motor that is connected to the rotating shaft of the drive wheels so that a drive power of the electric motor is transmitted to the rotating shaft;
    a balancing torque estimating unit for applying rotational torque to the electric motor in a direction opposite to the direction of torsional torque applied to the rotating shaft, while the rotating shaft is being locked by the parking lock mechanism, and for estimating balancing torque in advance that balances out the torsional torque, based on a state of a rotational phase of the electric motor; and
    a torque applying unit for applying torque to the electric motor upon operation of the parking lock operating unit to release the parking lock mechanism and before the locking via the parking lock mechanism is actually released, the torque being calculated based on the balancing torque estimated by the balancing torque estimating unit.

2. The drive device for an electric vehicle according to claim 1,
    wherein the balancing torque estimating unit estimates torque, when the rotational phase of the electric motor starts to change in a state where the opposite directional rotational torque is applied to the electric motor, as the balancing torque.

3. The drive device for an electric vehicle according to claim 1,
    wherein the balancing torque estimating unit estimates the balancing torque by applying the opposite directional rotational torque to the electric motor when receiving a signal indicative of the turning-on of an ignition switch.

4. The drive device for an electric vehicle according to claim 2,
    wherein the balancing torque estimating unit estimates the balancing torque by applying the opposite directional rotational torque to the electric motor when receiving a signal indicative of the turning-on of an ignition switch.

5. The drive device for an electric vehicle according to claim 1, further comprising:
    a balancing torque storing unit for storing the estimated balancing torque,
    wherein the balancing torque estimating unit estimates the balancing torque by applying the opposite directional rotational torque to the electric motor, and then the balancing torque estimating unit releases an application of the rotational torque, and
    wherein after the locking is released by the parking lock operating unit, the torque applying unit applies the balancing torque, stored in the balancing torque storing unit, to the electric motor.

6. The drive device for an electric vehicle according to claim 2, further comprising:
    a balancing torque storing unit for storing the estimated balancing torque,
    wherein the balancing torque estimating unit estimates the balancing torque by applying the opposite directional rotational torque to the electric motor, and then the balancing torque estimating unit releases an application of the rotational torque, and wherein after the locking is released by the parking lock operating unit, the torque applying unit applies the balancing torque, stored in the balancing torque storing unit, to the electric motor.

7. The drive device for an electric vehicle according to claim 3, further comprising:
a balancing torque storing unit for storing the estimated balancing torque,
wherein the balancing torque estimating unit estimates the balancing torque by applying the opposite directional rotational torque to the electric motor, and then the balancing torque estimating unit releases an application of the rotational torque, and
wherein after the locking is released by the parking lock operating unit, the torque applying unit applies the balancing torque, stored in the balancing torque storing unit, to the electric motor.

8. The drive device for an electric vehicle according to claim 4, further comprising:
a balancing torque storing unit for storing the estimated balancing torque,
wherein the balancing torque estimating unit estimates the balancing torque by applying the opposite directional rotational torque to the electric motor, and then the balancing torque estimating unit releases an application of the rotational torque, and
wherein after the locking is released by the parking lock operating unit, the torque applying unit applies the balancing torque, stored in the balancing torque storing unit, to the electric motor.

9. The drive device for an electric vehicle according to claim 1,
wherein the balancing torque estimating unit estimates the balancing torque by applying the opposite directional rotational torque to the electric motor until the locking via the parking lock mechanism is released after the locking is released by the parking lock operating unit.

10. The drive device for an electric vehicle according to claim 2,
wherein the balancing torque estimating unit estimates the balancing torque by applying the opposite directional rotational torque to the electric motor until the locking via the parking lock mechanism is released after the locking is released by the parking lock operating unit.

11. The drive device for an electric vehicle according to claim 1, further comprising:
an incline detecting unit for detecting a state of an inclinations of the vehicle,
wherein the balancing torque estimating unit determines a direction of the torque being applied to the electric motor based on a direction of the inclinations detected by the incline detecting unit.

12. The drive device for an electric vehicle according to claim 2, further comprising:
an include detecting unit for detecting a state of an inclinations of the vehicle,
wherein the balancing torque estimating unit determines a direction of the torque being applied to the electric motor based on a direction of the inclinations detected by the incline detecting unit.

13. The drive device for an electric vehicle according to claim 3, further comprising:
an incline detecting unit for detecting a state of an inclinations of the vehicle,
wherein the balancing torque estimating unit determines a direction of the torque being applied to the electric motor based on a direction of the inclinations detected by the incline detecting unit.

14. The drive device for an electric vehicle according to claim 4, further comprising:
an incline detecting unit for detecting a state of an inclinations of the vehicle,
wherein the balancing torque estimating unit determines a direction of the torque being applied to the electric motor based on a direction of the inclinations detected by the incline detecting unit.

15. The drive device for an electric vehicle according to claim 5, further comprising:
an incline detecting unit for detecting a state of an inclinations of the vehicle,
wherein the balancing torque estimating unit determines a direction of the torque being applied to the electric motor based on a direction of the inclinations detected by the incline detecting unit.

16. The drive device for an electric vehicle according to claim 6, further comprising:
an incline detecting unit for detecting a state of an inclinations of the vehicle,
wherein the balancing torque estimating unit determines a direction of the torque being applied to the electric motor based on a direction of the inclinations detected by the incline detecting unit.

17. The drive device for an electric vehicle according to claim 7, further comprising:
an incline detecting unit for detecting a state of an inclinations of the vehicle,
wherein the balancing torque estimating unit determines a direction of the torque being applied to the electric motor based on a direction of the inclinations detected by the incline detecting unit.

18. The drive device for an electric vehicle according to claim 8, further comprising:
an incline detecting unit for detecting a state of an inclinations of the vehicle,
wherein the balancing torque estimating unit determines a direction of the torque being applied to the electric motor based on a direction of the inclinations detected by the incline detecting unit.

19. The drive device for an electric vehicle according to claim 9, further comprising:
an incline detecting unit for detecting a state of an inclinations of the vehicle,
wherein the balancing torque estimating unit determines a direction of the torque being applied to the electric motor based on a direction of the inclinations detected by the incline detecting unit.

20. The drive device for an electric vehicle according to claim 10, further comprising:
an incline detecting unit for detecting a state of an inclinations of the vehicle,
wherein the balancing torque estimating unit determines a direction of the torque being applied to the electric motor based on a direction of the inclinations detected by the incline detecting unit.

* * * * *